United States Patent [19]

Petersen

[11] 4,034,633
[45] July 12, 1977

[54] SAFETY SHIELD CONSTRUCTION

[75] Inventor: Paul S. Petersen, Minnetonka, Minn.

[73] Assignee: Toolmark Co., Minneapolis, Minn.

[21] Appl. No.: 659,982

[22] Filed: Feb. 23, 1976

[51] Int. Cl.² .................................. B23B 25/04
[52] U.S. Cl. ............................ 82/34 R; 142/55; 144/251 R; 292/DIG. 22
[58] Field of Search ............... 82/34 R; 142/55; 144/251; 29/DIG. 56, DIG. 57, DIG. 58; 292/DIG. 22; 49/315, 322, 394

[56] References Cited
U.S. PATENT DOCUMENTS

| 2,714,926 | 8/1955 | Nichta | 82/34 R X |
| 3,204,499 | 9/1965 | Schoenrock | 82/34 R |

FOREIGN PATENT DOCUMENTS

| 546,349 | 8/1922 | France | 82/34 |
| 58,179 | 1/1891 | Germany | 82/34 |

Primary Examiner—Leonidas Vlachos

Attorney, Agent, or Firm—Dugger, Johnson & Westman

[57] ABSTRACT

A safety shield construction for use with wood turning lathes and similar machines which provide a "see through" shield mounted in a perimeter frame which is movable between closed and open positions. Inertia actuated locks prevent the shield from being knocked open by a sharp blow from a broken workpiece, but permit the shield to be moved to the open position manually. The inertia locks are fail safe and are moved to locked position whenever the shield is moved to closed position. Thus if the inertia locks become inoperative they will be in locked position for safety. The shield construction includes rigid supports attached to the lathe bed which utilize a rigid torque tube that attaches on brackets which permit adjustment of the shield along the length of the lathe to not only serve as a shield for long workpieces, but also as a shield during face plate operation. The torque tube is not substantially longer than the length of the frame of the shield, and permits longitudinal adjustment while maintaining rigidity and strength.

22 Claims, 6 Drawing Figures

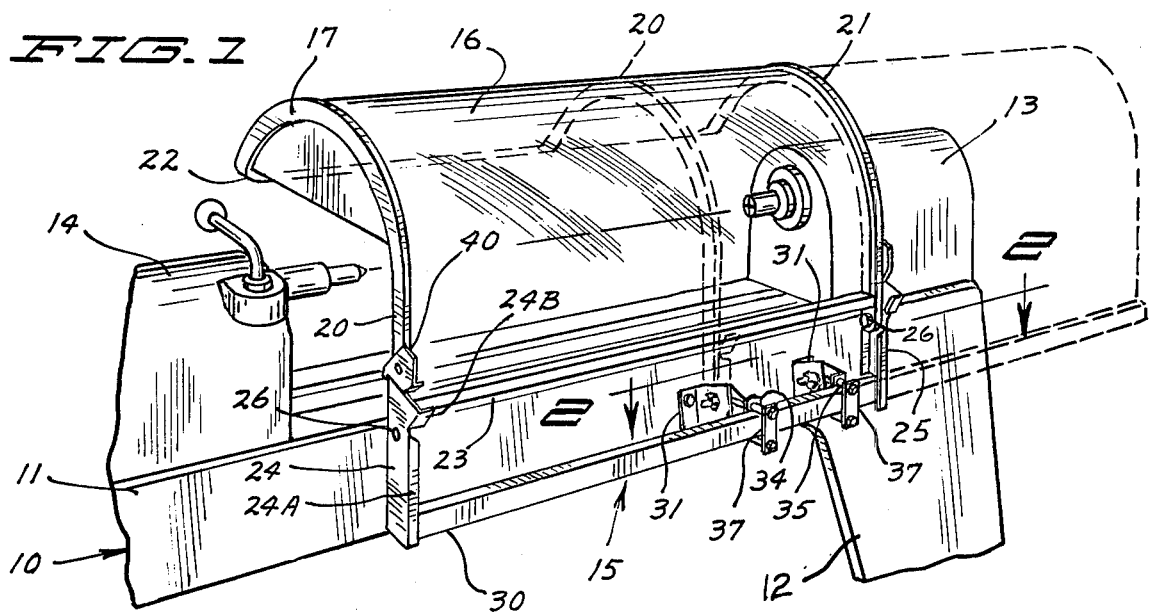
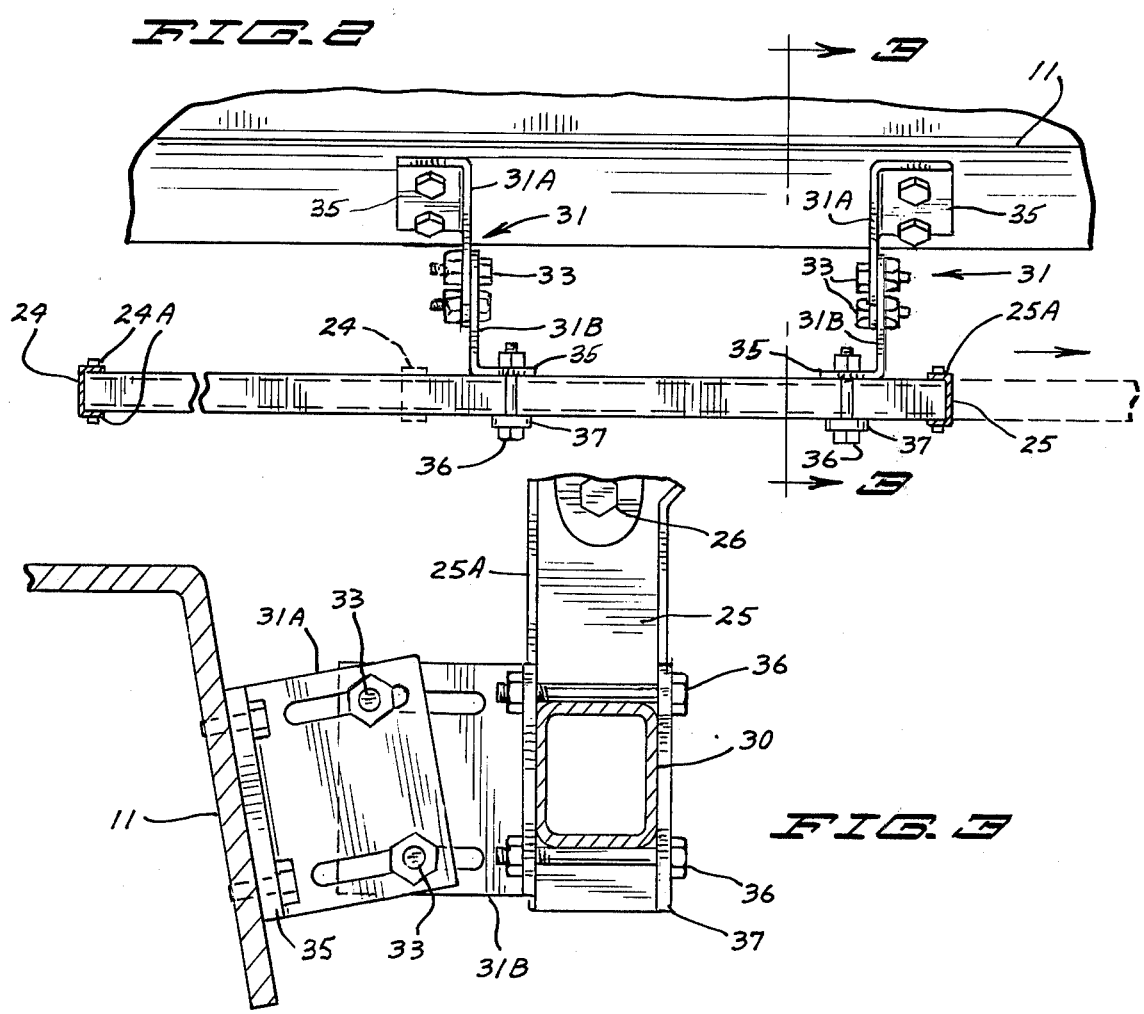

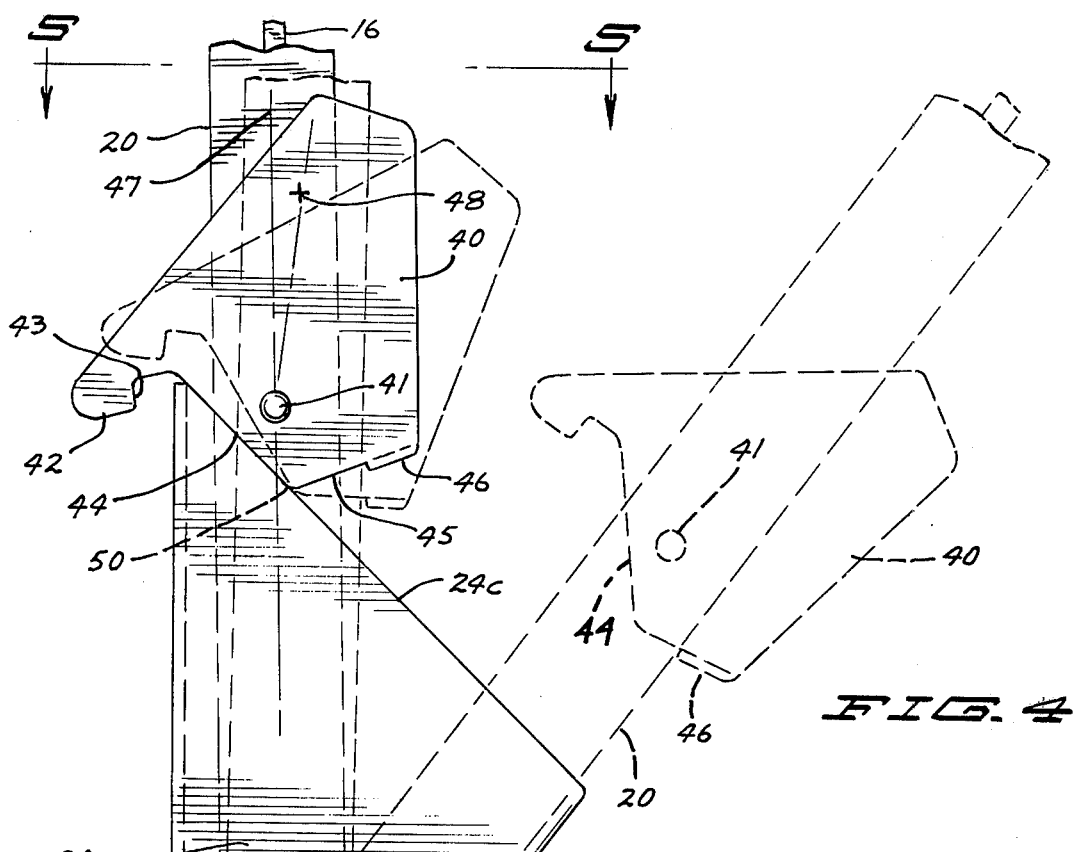
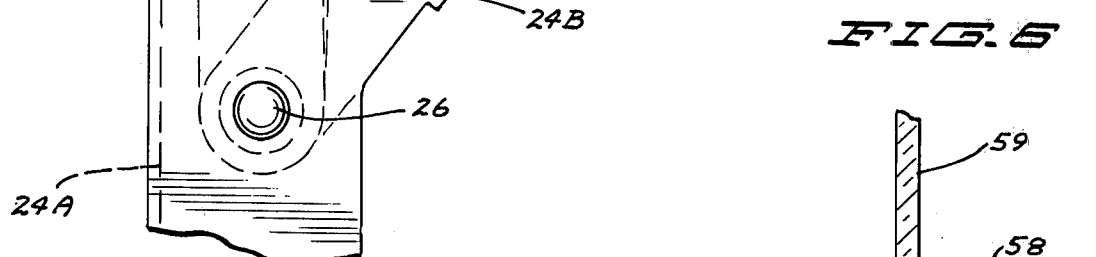
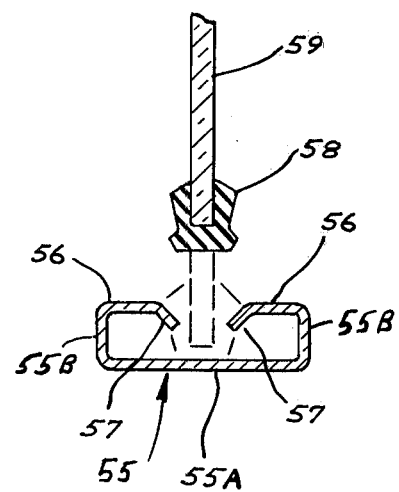

SAFETY SHIELD CONSTRUCTION

BACKGROUND OF THE INVENTION

1. Field of the Invention

The present invention relates to inertia actuated safety locks for members movable between two positions, such as a shield for wood turning lathes and the like, and shield mountings and construction.

2. Prior Art

Safety shields for wood turning lathes have been known in the prior art, and are exemplified by U.S. Pat. No. 3,204,499. A transparent shield having a hinged section is utilized in that device. The cost of manufacturing can get relatively high because of the large number of pieces used, and also the device is not as rigid as is desirable for safety when keeping costs low. Further, the hinged section of the shield is such that a workpiece flying out of the lathe may cause the hinged section to open at an unwanted time.

The commercial version of the device shown in U.S. Pat. No. 3,204,499 used a pair of brackets which were widely spaced and a square support tube. In order to obtain adequate adjustment in such a device the support tube was much longer than the shield. The support bar shown in U.S. Pat. No. 3,204,499 has the same relative length.

SUMMARY OF THE INVENTION

The present invention relates to inertial safety locks and more particularly to such locks used with safety shields.

The shield shown comprises a rigid, compact, easily manufactured lathe shield comprising a transparent panel that will overlie the workpiece on a wood working lathe, or on a similar machine tool. The transparent panel is mounted in a perimeter frame that is pivotally mounted so that the entire shield can be pivoted to an open position to permit removal and insertion of workpieces. The locks prevent movement of the shield under high accelerations such as would occur if it were struck by a flying workpiece.

The perimeter frame combines the strength features of the frame members and the shield itself to give a rigid assembly that provides adequate protection for the user, while remaining light and easily installed, and operable. The frame is pivoted to support brackets for movement from a closed (safety) position to an open position.

The inertial locks normally will permit manual opening of the shield about its pivots without interference. The inertial locks are designed so that they are positively moved to locked position when the shield is moved to its working position. The locks are fail safe in that if the locks bind the shield will be locked in safety position to prevent an accident from happening.

The brackets mounting the shield are mounted onto a torque tube that is not substantially longer than the shield itself, and which torque tube in turn is rigidly clamped into mounting brackets that are rigidly clamped to the lathe (or machine tool) bed. The mounting brackets are spaced relatively closely together adjacent the head of the lathe as shown and the torque tube cantilevers toward the tail stock. This permits the torque tube to be slid relative to the brackets to a position where it can be used for face plate turning, without requiring the present extra length torque tubes to provide the adjustment. The supports utilize a very rigid, square cross section tube that, when clamped to the mounting brackets, reinforces and braces the lathe bed or frame to prevent the lathe frame from distorting under loads as well as preventing the shield from vibrating or deflecting excessively.

The combined features of the perimeter frame used with a curved plate of transparent plastic material provides a shield that is rigid, and strong, while light in weight. The inertial locks provide a fail safe, locking action to prevent the shield from opening at an unwanted time, and the rigid torque tube permits ease of adjustment of the unit for various turning configurations without requiring an excessive length of the torque tube but providing the necessary rigidity.

BRIEF DESCRIPTION OF THE DRAWINGS

FIG. 1 is a perspective view of a wood turning lathe having a safety shield made according to the present invention installed thereon;

FIG. 2 is a fragmentary sectional view taken as on line 2—2 in FIG. 1;

FIG. 3 is a sectional view taken as on line 3—3 in FIG. 2;

FIG. 4 is a fragmentary side view of a support bracket and lower portions of a frame used with the shield of the present invention showing the inertial lock of the present invention;

FIG. 5 is a sectional view taken as on line 5—5 in FIG. 4; and

FIG. 6 is a fragmentary sectional exploded view showing a cross section of a modified form of the perimeter frame for the shield, with a shield plate about to be inserted into the modified frame.

DESCRIPTION OF THE PREFERRED EMBODIMENTS

Referring to the drawings and the numerals of reference thereon, in FIG. 1 a wood working lathe indicated generally at 10 includes a lathe bed or frame 11 mounted onto a stand 12. The lathe has a head stock 13, and a tail stock 14 mounted at opposite ends of the bed or frame 11. The workpiece would normally be positioned between the head and tail stock and rotated for working in a normal manner for wood working lathes. The frame or bed 11 of an ordinary lathe has adequate strength of ordinary turning of workpieces held in the lathe, but lacks sufficient rigidity for supporting a large number of accessories. The significance of the lack of extra rigidity of ordinary lathe beds will become apparent as the mounting of the present safety shield is explained.

A safety shield assembly illustrated generally at 15 is shown mounted onto the lathe 10, and includes a transparent shield plate or member 16 which is mounted in a perimeter type frame assembly 17. As can be seen, the perimeter frame includes a pair of curved side frame members 20 and 21, which can be formed as a unitary assembly with a front lower longitudinal edge frame member 22, and a rear longitudinal edge frame member 23 that extends between the side members 20 and 21 and is fixedly fastened thereto in a suitable manner. Portions of the side frame members 20 and 21 extend downwardly from the rear longitudinal edge member 23 and each of the side members is pivotally mounted to one of a pair of mounting brackets 24 and 25 with pivot pins 26 defining a pivot axis.

The perimeter frame members are constructed as shown in cross section in FIG. 5. The perimeter frame members each are bar type members having a width in direction of the thickness of the shield plate or member 16, that is substantially greater than the thickness of the plate member 16. The perimeter frame members are provided with a groove 27 having serrated surfaces into which the edges of the plate member 16 are forced, or secured with suitable adhesives, so that the plate is held securely. The plate member 16 is made of a suitable plastic material that has high impact resistance and is transparent. A 3/16 inch thick curved sheet of cellulose-acetate-butyrate (C-A-B) has been found satisfactory, and also certain polycarbonates, such as that sold under the Trademark LEXAN have been found to be satisfactory. In some instances acrylic material has also been satisfactory, but generally this lacks sufficient impact resistance for the more severe applications.

Thus, in forming the shield assembly, the shield member 16 is curved as shown, and the perimeter frame members are formed. The member 23 is left removed, and the shield is then inserted into the grooves 27 in the perimeter frame members 20, 21 and 22 so that the plate edges are securely held. Then the rear longitudinal edge frame member 23 is put into place with the rear edge of plate 16 in the provided groove. The frame member 23 is then secured to members 20 and 21, respectively, in a suitable manner. Member 23 can be welded into place, or even held with suitable adhesives if desired. In any event, it can be seen that the increased strength achieved by the width of the frame members 20, 21, 22 and 23 in the same direction as the thickness of the shield member or plate 16 increases the resistance of the assembly to bending about longitudinal axes.

Additionally, the perimeter type frame is normally quite susceptible to bending in a lateral direction, that is, tending to move into a parallelogram configuration, by bending at the corners where the side members and the edge members join. However, with the shield plate 16 in place, it resists racking or parallelogramming. The shield plate is strong in shear strength and thus a rigid assembly is formed which keeps the frame from bending or racking when it is mounted to the plate.

Therefore, in the weak bending direction of the plastic, that is along an axis generally parallel to its longitudinal length, the wider perimeter side frame members 20 and 21 do offer additional resistance to bending. The racking or tendency to parallelogram is resisted by the substantial strength of the shield member 16.

The mounting brackets 24 and 25 are attached to opposite ends of a rigid torque tube 30 which is a closed, square tubular member of substantial dimension that resists twisting. As shown, the brackets 24 and 25 have two front and rear flanges 24A and 25A that slip over opposite sides of the torque tube 30. These flanges are fastened to the torque tube. The brackets 24 and 26 extend uprightly from the torque tube and are formed so that the forward flanges 24A and 25A that is, the flanges next adjacent to the lathe bed, extend upwardly above the pivot points 26. Referring specifically to FIGS. 4 and 5, this upper end construction of bracket 24 can be seen in detail, and it should be noted that the bracket 25 is made in the same manner, but is reversed.

The torque tube 30 is mounted onto a pair of bracket assemblies 31, each of which includes identical bracket portions 31A and 31B. The bracket portions each include a main plate and flanges 35 at right angles to the main plates. The flanges 35 of one bracket portion of each assembly is fixed through suitable cap screws to a surface of the lathe bed or frame 11. The second portions 31B are attached to the base portions 31A, respectively, through slotted connections and cap screws 33 passing through the main plates of the brackets. This permits adjusting of the bracket assemblies to accommodate draft or taper of the side surfaces of the lathe bed 11, and also to adjust the position of the torque tube relative to the lathe bed.

The torque tube is then firmly clamped against flanges 35, on the respective bracket portion 31B, through the use of cap screws 36 and clamp straps 37. In this manner, the square torque tube can be tightly clamped to the brackets, and because the brackets are very rigid and have substantial vertical depth, the torque tube is held securely even though it is cantilevered from the brackets. The torque tube also resists torsion to a great degree because of its square tube construction, and relatively large size, so that the unit actually reinforces the lathe bed and prevents the lathe bed itself from twisting under loads on the cantilevered end of the torque tube 30. The arrangement of the two closely spaced brackets adjacent the head stock 13 on the lathe bed permits the torque tube to be slid lengthwise so that the shield would be in a position as shown in dotted lines in FIG. 1, with the frame member 20 adjacent to the head stock for face plate turning or similar work adjacent to the head stock only. The dotted line position of bracket 24 is also shown in FIG. 2.

Further, the brackets 31 can be attached to horizontal surfaces, for example on the stand used for the lathes so that the brackets are not mounted directly to the lathes if desired. The bracket assemblies are spaced apart a distance not substantially greater than one-third the length of the torque tube 30, and as shown, both bracket assemblies are between the end brackets 24 and 25 on the torque tube.

The upper end portion of the brackets 24 and 25 are flared rearwardly and at the rear edge of the upper portion tabs 24B and 25B, respectively are formed on the brackets to provide a rear stop for the side members 20 and 21, respectively. The stop flanges prevent pivoting of the shield in a direction away from the lathe beyond a desired position. This position is shown in dotted lines in FIG. 4.

The pivot pins 26 support the side frame members of the shield assembly for pivoting movement from an operative (closed) position shown in solid dotted lines in FIG. 4, and also in solid lines in FIG. 1, to an open position where the shield plate 16 is spaced from the head and tail stock so that workpieces can be inserted or removed with ease. The shield is used for safety purposes, and of course it is necessary that the shield not pivot except when it is desired. For example if a workpiece flies out of the lathe, the shield must remain in position to prevent the workpiece from injuring someone standing adjacent to the lathe. Yet, the shield must be pivotable to an open position for ease of change of workpieces and the like. In order to provide safety, and yet accommodate pivoting movement when it is desired, inertial locks are provided on each of the side frame members 20 and 21, respectively, which locks cooperate with the brackets 24 and 25, respectively, to lock the shield from pivoting when the shield is moved toward an open position under rapid acceleration, such as when it would be struck by a flying workpiece. The locks will automatically open as the shield is moved manually or gently from its working (closed) position to its non-working (open) position.

The inertial locks are shown typically in FIG. 5, and includes a latch dog or lock member 40 that is pivotally mounted on a separate suitable pivot pin 41 to the respective side frame member 20 or 21. The latch dogs 40 are used on both sides of the frame member, for redundant locking capabilities, and the latch dogs 40 include a latching hook portion 42 extending forwardly from the pivot 41, which hook portion includes a latch shoulder surface 43 that is positioned to engage the forward edge of the forward leg 24A or 25A of the respective bracket 24 or 25 with which the lock dog cooperates. The latch dogs 40 have a stop edge surface 44 which, when the lathe is in its closed position will engage and rest against the upper edge surface 24C or 25C of the respective bracket 24 or 25, and stop the shield positively in its forward direction. It should be pointed out that the forwardly projecting portions of the shield plate 16 and the frame assembly will tend to cause the shield to continue pivoting toward the lathe, once its center of gravity has gone over center and thus the weight of the shield itself will hold the surface 44 against the surfaces 24C or 25C, respectively. The lower edge 44 of each latch dog also has a surface 45 that joins the surface 44. A stop lug or tab 46 is bent over at the rear end of the surface 45 and the lug or tab will engage the rear edge of its respective frame member 20 or 21 to form a stop to limit pivoting of the latch dog in counterclockwise direction when the shield is opened. The dogs will be held in a ready position, as shown in the dotted line positions of FIG. 4.

The rear portions of the latch dog 40 are formed so that there is sufficient mass to the rear of a vertical plane indicated at 47 which passes through the axis of pivot pin 41 when the shield is in its closed or working position, as shown in solid lines in FIG. 4, so that the center of gravity of the latch dog 40, which is indicated at 48 in FIG. 4, is to the rear of this vertical plane 47. Thus, when the shield assembly is pivoted rearwardly from its closed position at all, the latch dog 40 will tend to pivot in a counterclockwise direction as viewed in FIG. 4 because the center of gravity 48 is to the rear of the plane 47. Further, the latch dog 40 is formed so that the center of gravity 48 is a sufficient distance above the axis of pin 41 so that it will be sensitive to inertial forces on the latch dog 40 occasioned by the rapid movement of the shield assembly 15 about its pivots 26 in a rearward direction. If the inertial forces are high, the latch dogs 40 will tend to remain in locked position because of the moment created by the inertia acting through the center of gravity 48 and causing the latch dogs 40 to pivot on pins 41 while the frame members 20 and 21 pivot rearwardly.

The sensitivity of the latch dogs 40 to inertial forces can be changed by adjusting the center of gravity position with respect to the pivot of pins 41 in a vertical direction, while the sensitivity of the latch dogs 40 in respect to their tendency to rotate to unlocked position can be changed by moving the center of gravity toward or away from the vertical plane 47 that also passes through the pivot axis of pin 41 when the shield is in operative or closed position.

It can be seen, however, that when the shield assembly is pivoted slowly, the latch dogs tend to pivot in clockwise direction about pins 41 and lift the hook and locking surfaces 43 to position where they will clear the upper edge of the flanges 24A and 25A and the shield can be moved to its open position indicated at dotted lines in FIG. 4. It can be seen that in this position the tab 46 will stop against the frame side members, so that the inertial lock, while being open, is not permitted to freely swing under forces of gravity.

When the shield assembly is moved toward its working position, the latch dogs will move to the second dotted line position shown in FIG. 4 wherein the corner or edge indicated at 50 will engage the upper edge surface 24 of the bracket 24 (on the side of the frame shown). The hook 42 will still be raised sufficiently high to clear the upper edge of flange 24A, but as the shield assembly moves more toward its closed position, the engagement of the edge 50 with the edge 24C will positively pivot the latch dog about the axis of pin 41 to its solid line locked position. This will occur even if there is some drag or friction on the latch dog pivot formed by the pin 41. The same action occurs on the latch dog mounted on frame member 21.

This action of positively moving the latch dogs 40 to a position wherein the shoulder 23 would interfere with the flange 24A (or 25A on the other side) is a positive lock feature so that if there is friction or other malfunction that would tend to bind the pivot 41, the latch dogs 40 will be forced to locked position, and prevent opening of the shield until such time that the malfunction was corrected so that the latch dogs 40 would pivot open under gravity during opening of the shield assembly under low acceleration forces. Thus, the latch dogs engage the supports in a manner which will move or pivot each of the latch dogs to their normally locked position as the shield is moved closed, and only when the latch dogs work freely will they unlock. Thus a fail safe feature is provided.

In FIG. 6, a modified configuration for the perimeter frame assembly is shown. A formed steel channel member 55, as shown, has a base 55A and a pair of legs 56,56 that overlie the base of the channel and are spaced therefrom by channel walls 55B. Legs 56 have small prong end portions 57,57 that taper toward base 55A together define a slot into which a resilient perimeter moulding strip 58, that has a slot to receive a shield member 59 (which is the same as shield member 16) is forced or attached with adhesive. As shown in the dotted line position of FIG. 6 when the moulding 58 is forced into the space between the locking edge portions 57,57, it will be locked positively into the unit and held securely. Any attempt to pull the shield member 59 or the moulding 58 out of the channel will tend to straighten out the end portions 57,57 and more tightly grip and assembly rather than release it.

The rigid frame assembly thus may be made with the formed metal channel, because the resistance to bending from the width of the channel, and the rigidity provided for the perimeter frame by the shield plate or member itself.

Therefore, the safety shield assembly includes the feature of inertial locks which move to a locked position when the shield is placed in its working position, and which are failsafe in that if the inertial lock movement is not proper, the locks will remain locked to prevent the shield (or other safety member) from being opened until the malfunction is corrected. The opening action is due to positioning of the center of gravity of the lock in a desired location to provide pivoting action when the inertial loads are not sufficiently great to hold the unit in locked position. The locks are mechanically moved to locked position when the shield is closed.

The mounting torque tube for the shield assembly is not substantially greater in length than the shield, and the torque tube itself may be slid relative to its mounting brackets for adjustment in position of the shield in the longitudinal direction of the lathe.

The construction of the shield assembly itself is also unique. The shield uses a continuous transparent shield plate extending from the front edge (member 22), which is low enought to protect an operator and just slightly above the horizontal plane passing through the turning axis of the lathe and curving up and over the lathe as shown, and then extending down on the opposite side of the lathe to the rear edge (member 23) which is positioned substantially below the said horizontal plane. This lower edge portion will shield observers at the rear of the lathe. Thus, for schools and the like where demonstrations take place, the observers may stand to the rear, out of the way of the operator, and they will be protected and also have a clear view of the work. The perimeter frame does not create any obstruction to vision that is detrimental.

An optional end shield is shown on frame member 20, but such end shield is removably attached and is not used in many instances.

I claim:

1. In a safety shield assembly having a support, and a movable shield member mounted on said support for movement between a first and a second position, the improvement comprising inertia actuated lock means for preventing said movable member from moving from said first position to said second position under acceleration forces exceeding a predetermined amount, said inertia lock means comprising a lock member, means to mount said lock member on said movable member for movement from a locked to an unlocked position, said lock means including a latch portion engageable with a portion of said support to prevent substantial movement of said movable member toward said second position when said movable member is in said first position and the lock member is in locked position, said lock member having a center of gravity positioned with respect to said means to mount said lock member so that said lock member is urged by gravity to move to unlocked position and being oriented so that inertia forces on the lock member will cause said lock member to move to said locked position when the acceleration of said moveable member from said first position toward said second position is greater than a predetermined amount.

2. The combination as specified in claim 1 wherein said lock member is pivotally mounted on said movable member, means on said support engaging said lock member and urging said lock member to is locked position against the force of gravity as the movable member moves to is first position.

3. The combination as specified in claim 1 wherein said movable member comprises a pivoting member mounted to said support, said lock member being pivotally mounted to said movable member at a location spaced from said pivot between said support and said movable member.

4. The combination as specified in claim 1 wherein said support includes a plate portion positioned closely adjacent said movable member, said plate portion having an edge portion, said lock member comprising a latch having a hook portion, and tending to pivot under gravity to position with the hook portion raised upwardly, to reach the unlocked position, stop means cooperating between said movable member and latch holding said latch in a stopped position when unlocked, said latch having an edge portion adapted to engage said edge portion of said support and to be pivoted by reaction between the edge portions to locked position as said movable member is moved to said first position.

5. The combination as specified in claim 1 wherein said movable shield member has opposite side frame members, each of said frame members being pivotally mounted to said support about a common pivot axis.

6. The combination as specified in claim 5 wherein said lock means comprises two separate lock members each pivotally mounted to one of the opposite side frame members of said shield.

7. The combination as specified in claim 5 wherein said support includes a torque tube of substantial cross sectional dimension, said torque tube being an enclosed rectilinear cross section tubular member, bracket means comprising two individual spaced brackets adapted to be fixedly attached to a machine tool and positioned adjacent each other and within the space between said side frame members of said shield, said brackets being spaced such that when one of said brackets is adjacent one end of said torque tube, the other of said brackets is spaced a substantial distance from the opposite end of said torque tube, and clamp means to securely clamp a surface of said torque tube to both of said brackets.

8. In combination, a support, an assembly movable between first and second positions, and which assembly is to be locked in a first position under impact loads that accelerate said assembly from said first position toward said second position at greater than a preselected acceleration level , means to mount said assembly with respect to said support for movement between said first and second positions, and an inertial latch for preventing movement of said assembly from said first position to said second position when acceleration forces on said assembly tending to move said assembly from the first positon to the second position exceed a preselected level including a latch dog pivotally mounted to said assembly, said latch dog having a latch portion and being movable from a first locked position wherein said latch portion will engage a portion of said support to a second unlocked position wherein said latch portion will clear said support and permit said assembly to move from said first position to said second position, said latch dog having a center of gravity located with respect to said pivot of said latch dog so that when the assembly is in said first position said latch dog tends to pivot under forces of gravity to an unlocked position, and tends to pivot to a locked position against the force of gravity when said assembly is accelerated toward its second position at greater than said preselected level, and means cooperating between said latch dog and said support to urge said latch dog to is locked position as said assembly moves from said position toward said first position, and to hold said latch dog in its locked position when the assembly is in said first position, said latch dog being free to move to its unlocked position under force of gravity prior to engagement of said latch portion with said support when the assembly is slowly accelerated away from its first position.

9. The combination as specified in claim 8 wherein said assembly comprises a safety shield having a support frame, a transparent shield plate portion mounted in said support frame, said support frame having opposite side frame members, said support including portions for pivotally mounting the opposite side frame portions of said shield.

10. The combination as specified in claim 9 wherein there are latch dogs on each of said side frame portions cooperating with separate portions of said support.

11. The combination as specified in claim 8 and stop means cooperating between said assembly and latch dog to prevent said latch dog from pivoting away from its locked position more than a preselected amount to reach its unlocked position.

12. The combination as specified in claim 10 wherein said upport comprises a pair of upright members having planar portions with upper edges, said planar portions of each upright member being positioned closely adjacent the outer surface of one of the side frame members of said shield, said latch dogs being pivotally mounted to one side frame members on the outer surfaces thereof, and said upper edge portions of said upright members providing the means to move said latch dogs to their locked positions as the assembly is moved to is first position.

13. The combination as specified in claim 9 wherein said support includes an elongated tubular member having a rectilinear cross section, bracket means for clamping said tubular member with respect to a machine tool on which said support is to be used, said bracket means being spaced apart when in use a distance not substantially greater than one-third the length of said tubular member and positioned between the ends of said tubular member when said shield is in operating position, means to releasably clamp one surface of said tubular member against said bracket means to form a rigid assembly, whereby said tube can be released from said means to clamp and slid longitudinally a substantial portion of its length while being supported by both of said bracket means.

14. The combination as specified in claim 13 and adjustable mounting members on said bracket means for permitting said bracket means to be securely clamped to a machine tool at a desired angular relationship thereto.

15. The combination as specified in claim 14 wherein each of said bracket means comprises two identical bracket portions, said bracket portions being formed with a main support leg and a secondary support leg at right angles to said meain support leg, and slot means on each of said main support legs to permit said main support legs of two bracket portions to be secured together at a desired angular relationship whereby said secondary support leg on one of said bracket portions of each of the bracket means can be attached to a machine tool, and the other secondary support leg of each of the other bracket portions provides a generally planar mounting surface against which one side of said rectilinear cross section tubular member may be clamped securely.

16. The combination as specified in claim 8 wherein saud assembly comprises a safety shield including a shield plate having marginal edges defining a length and a width, said shield plate being formed into a desired shape, and a perimeter frame for said shield plate including a pair of end frame members, and longitudinally extending edge frame members between said end frame members, said frame members having grooves defined therein for receiving and retaining said shield plate to form a rigid assembly connected to and surrounding said shield plate, said frame members having a width extending in the direction of the thickness of said shield plate substantially greater than the thickness of said shield plate.

17. A safety shield assembly for use with machine tools and including a shielf plate made of a transparent material and having longitudinal edges and end edges. a perimeter frame comprising a pair of end frame members, and a pair of longitudinally extending frame members, and a pair of longitudinally extending frame members, said frame members having a width extending in the direction of the thickness of said shield plate substantially greater than the thickness of said shield plate, and including grooves defined in one side thereof to receive the corresponding edge portions of said shield plate, means to hold said frame members in an assembly whereby the shield plate edges are seated in the grooves of adjacent frame members and the shield plate provides torsional rigidity, and said frame members provide bending strength about a longitudinal axis of said shield plate, said end frame members having portions that extend beyond one of said longitudinal edge frame members, means to pivotally mount said portions of said end frame members with respect to a machine tool on which said shield assembly is being used for movement of said shield assembly between a closed position and an open position, including a separate support member adjacent each of said end frame member portions, a separate latch dog pivotated to each of said end frame member portions, said latch dogs including latch hooks engageable with a portion of the respective support when in a locked position to prevent movement of said shield assembly from its closed to its open positions, said latch dogs normally being urged to unlocked position and having a center of gravity positioned relative to the pivot of the latch dogs to cause the latch dogs to tend to pivot toward a locked positioned when the shield assembly is accelerated in direction from its closed position toward its open position.

18. The combination of claim 25 wherein said perimeter frame member comprises a channel having a base, side wall members projecting from said base, wall means attached to the side wall members and extending toward each other from the opposite side wall members and being spaced from and parallel to said base, said wall means each having edge portions extending toward said base and being spaced apart to define a slot for receiving said plate, said edge portions tending to move closer together when moved away from said base.

19. The combination of claim 18 and a resilient edge member having a groove for receiving edge portions of said plate, said edge porton of said wall means being spaced to receive said edge member and engage the sides of said edge member to hold dthe plate between the wall means of said channel.

20. The shield of claim 17 wherein said shield is adapted for attachment to a latche having a turning axis, said shield plate being formed in a curved shape curving from one longitudinal edge frame member to extend upwardly and over a latche on which it is attached and extending downwardly on an opposite side of a latche on which it is attached from the one longitudinal edge to the other longitudinal edge, said other longitudinal edge being below the turning axis of a lathe on which the shield is attached, and the longitudinal edge extending in direction along such turning axis.

21. A safety assembly which latches under inertial loads including a support member, a movable member mounted on said support member for movement between a first and a second position, inertia actuated lock means operable between the members for preventing said movable member from moving from said first position to said second position when acceleration forces on the movable member tending to move the movable member from the first to second positions exceed a desired level, said inertia actuated lock means comprising a latch dog, means to mount said latch dog on one of said members for movement between locked and unlocked positions, said latch dog including a latch portion engageable with a portion of the other of said members to prevent substantial movement of said movable member toward said second position when said movable member is in said first position and the latch dog is in locked position, said latch dog having a center of gravity positioned with respect to said means to mount said latch dog so that said latch dog is urged by gravity to move to unlocked position, and said latch dog being oriented so that inertia forces on the latch dog will cause said latch dog to move to said locked position when acceleration acting on said movable member tending to move the movable member from said first position toward said second position is greater than the desired level, and means cooperating between said members to urge said latch dog to locked position as the movable member is moved to said first position.

22. A safety assembly of claim 21 wherein said means to mount said latch dog comprises a pivot means, and said latch dog being free to pivot between said first and second positions in response to forces acting thereon.

* * * * *

UNITED STATES PATENT AND TRADEMARK OFFICE
CERTIFICATE OF CORRECTION

PATENT NO. : 4,034,633
DATED : July 12, 1977
INVENTOR(S) : Paul S. Petersen

It is certified that error appears in the above—identified patent and that said Letters Patent are hereby corrected as shown below:

Column 4, line 49, after "solid" remove--dotted--. Column 6, line 51, "and" should be--the--. Column 7, line 9, "enought" should be--enough--; Column 7, line 53, (Claim 2, line 4), "is" should be--its--. Column 8, line 56, (Claim 8, line 28), "is" should be--its--; Column 8, line 57, (Claim 8, line 29), before "position" insert--second--. Column 9, line 13, (Claim 12, line 2), "upport" should be--support--. Column 10, line 5, (Claim 17, line 2), "shielf" should be--shield--; Column 10, delete line 9, (Claim 17, line 6); Column 10, line 28, (Claim 17, line 25), "pivotated" should be--pivoted--; Column 10, line 40, (Claim 18, line 1), "Claim 25" should be--Claim 17--; Column 10, line 54, (Claim 19, line 5), "dthe" should be--the--; Column 10, line 57, (Claim 20, line 2), "atche" should be--lathe--; Column 10, lines 60 and 62, (Claim 20, lines 5 and 7), "latche" should be--lathe--.

Signed and Sealed this

Eighth Day of November 1977

[SEAL]

Attest:

RUTH C. MASON
Attesting Officer

LUTRELLE F. PARKER
Acting Commissioner of Patents and Trademarks